United States Patent [19]

Tsubouchi

[11] Patent Number: 4,494,443
[45] Date of Patent: Jan. 22, 1985

[54] REACTION FORCE APPARATUS FOR A VACUUM BOOSTER

[75] Inventor: Kaoru Tsubouchi, Toyota, Japan

[73] Assignee: Aisin Seiki Kabushiki Kaisha, Kariya, Japan

[21] Appl. No.: 459,216

[22] Filed: Jan. 19, 1983

[30] Foreign Application Priority Data

Jan. 23, 1982 [JP] Japan .................. 57-007040[U]

[51] Int. Cl.³ .................................... B60T 13/54
[52] U.S. Cl. ................................ 91/369 A; 91/376 R
[58] Field of Search .............. 91/369 A, 369 B, 369 R, 91/376 R; 60/554; 308/4 R, 184 A, 184 R

[56] References Cited

U.S. PATENT DOCUMENTS

| 666,181 | 7/1863 | Price | 91/369 A |
|---|---|---|---|
| 1,621,858 | 3/1927 | Sherwood | 308/4 R |
| 3,150,493 | 9/1964 | Rike | 60/554 |
| 3,177,777 | 4/1965 | Kenrick | 91/369 A |
| 3,183,795 | 5/1965 | Kirk | 308/4 R |
| 3,393,536 | 7/1968 | Daur | 308/4 R |
| 3,754,450 | 8/1973 | Putt et al. | |
| 4,271,670 | 6/1981 | Ohmi | 60/554 |

FOREIGN PATENT DOCUMENTS

| 2481216 | 10/1981 | France | |
| 0167547 | 12/1981 | Japan | 91/369 A |
| 2044375A | 10/1980 | United Kingdom | 91/376 R |
| 2053395A | 2/1981 | United Kingdom | 91/369 A |
| 2064690A | 6/1981 | United Kingdom | 91/369 A |

Primary Examiner—William R. Cline
Assistant Examiner—Randolph A. Smith
Attorney, Agent, or Firm—Oblon, Fisher, Spivak, McClelland & Maier

[57] ABSTRACT

A vacuum booster which includes a push rod, a housing having a first and second compartment, a power piston located in the housing and operated by a pressure differential between the first and second compartments and which further includes a small and large diameter portion, a control valve operatively associated with the push rod and located within the power piston for controlling the pressure differential between the first and second compartments in response to movement of the push rod, an output member having a first end slidably disposed within the large diameter portion of the power piston wherein the control valve includes an air-valve element one end of which is slidably disposed in the small diameter portion of the power piston a resilient reaction disc located adjacent the first end of the output member and disposed within the large diameter portion of the power piston, a metallic sleeve provided between an outer peripheral portion of the first end of the output member and an outer peripheral portion of the reaction disc and a resilient member provided between the large diameter portion and the metallic sleeve.

6 Claims, 3 Drawing Figures

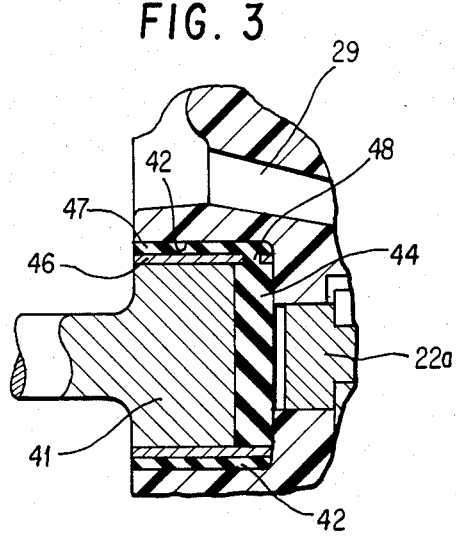

REACTION FORCE APPARATUS FOR A VACUUM BOOSTER

BACKGROUND OF THE INVENTION

1. Field of the Invention

This invention relates to a vacuum booster and more particularly to a rubber disc type reaction force apparatus for a vacuum brake booster for automobiles.

2. Description of the Prior Art

There have been developed two types of reaction force apparatuses for brake boosters. One of them is a so-called lever type and the other is a rubber disc type which is shown in U.S. Pat. No. 3,745,450 for example. The latter type is considered simpler in construction and easier to assemble as compared with the former type.

The prior art disclosed in U.S. Pat. No. 3,754,450 shows a rubber type disc disposed between the output rod and power piston. In this prior art reference, the output rod is indirectly contacted with the resinous power piston, which results in damage to the contacting surface of the resinous piston in use.

SUMMARY OF THE INVENTION

According to the present invention, a metal sleeve is provided between the output rod, reaction disc, and resinous piston while a resilient member is provide between the outer surface of the sleeve and the resinous piston to protect the contacting surface of the latter and to thus obviate the aforementioned drawbacks of the prior art.

In accordance with the present invention a vacuum booster is provided which includes a push rod, a housing having a first and second compartment, power piston means located in the housing and operated by a pressure differential between the first and second compartment and which further comprises a small diameter portion and a large diameter portion, control valve means operatively associated with the push rod and located within the power piston means for controlling the pressure differential between the first and second compartments in response to the movement of the push rod, output means having a first end slidably disposed within the large diameter portion of the power piston means wherein the control valve means further includes an air-valve element one end of which is slidably disposed in the small diameter portion of the power piston means, a resilient reaction disc located adjacent the first end of the output means and disposed within the large diameter portion of the power piston means, a metallic sleeve provided between an outer peripheral portion of the first end of the output means and an outer peripheral portion of the reaction disc, and a resilient member provided between the large diameter portion and the metallic sleeve.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 shows a detailed illustration of the first embodiment of the present invention.

DETAILED DESCRIPTION OF THE PREFERRED EMBODIMENTS

Figures 1, 2:
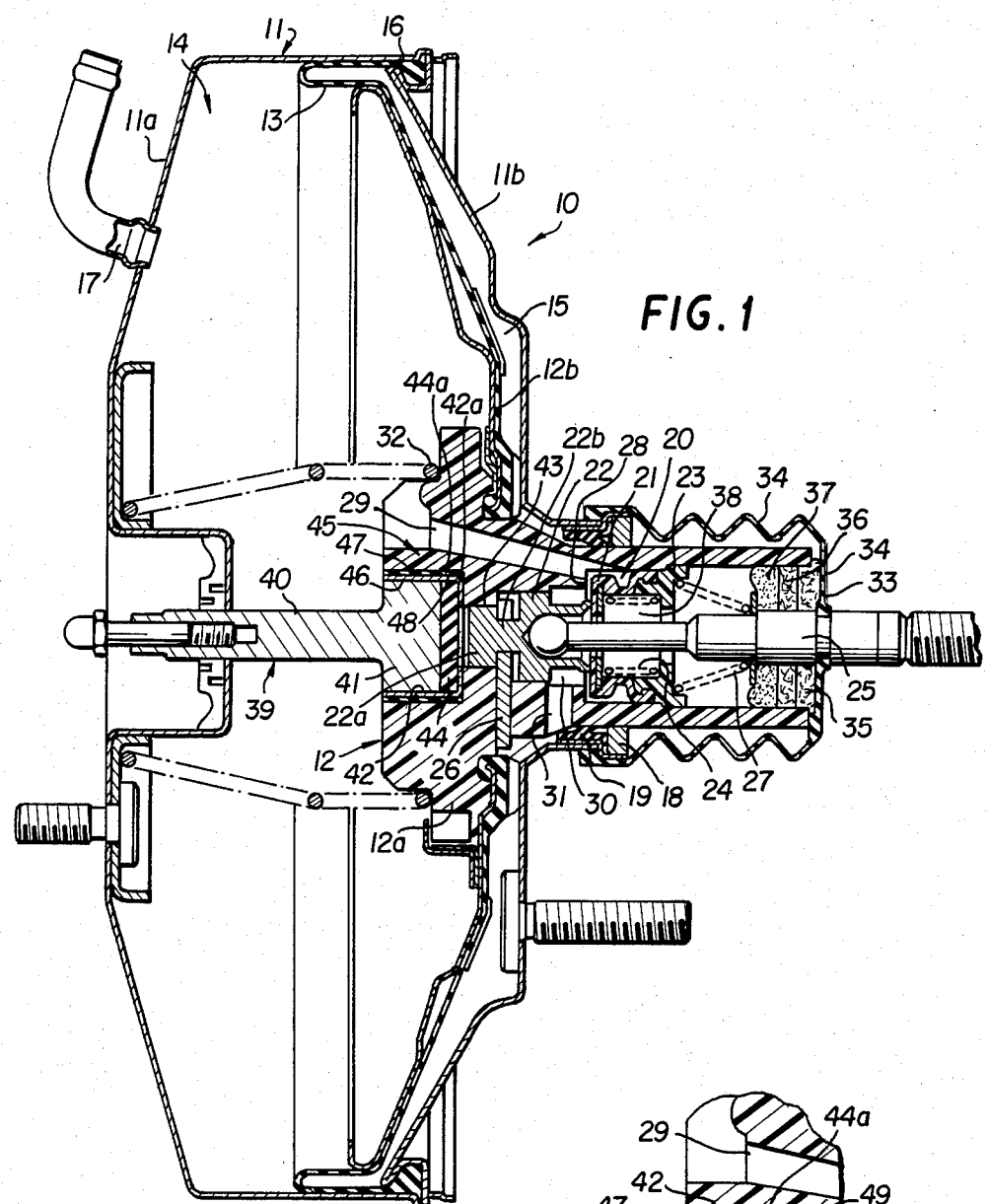
FIG. 1 shows a first embodiment of the present invention in a cross sectional view.
FIG. 2 shows an alternate embodiment illustrating the reaction force apparatus of the present invention.
Figure 1:
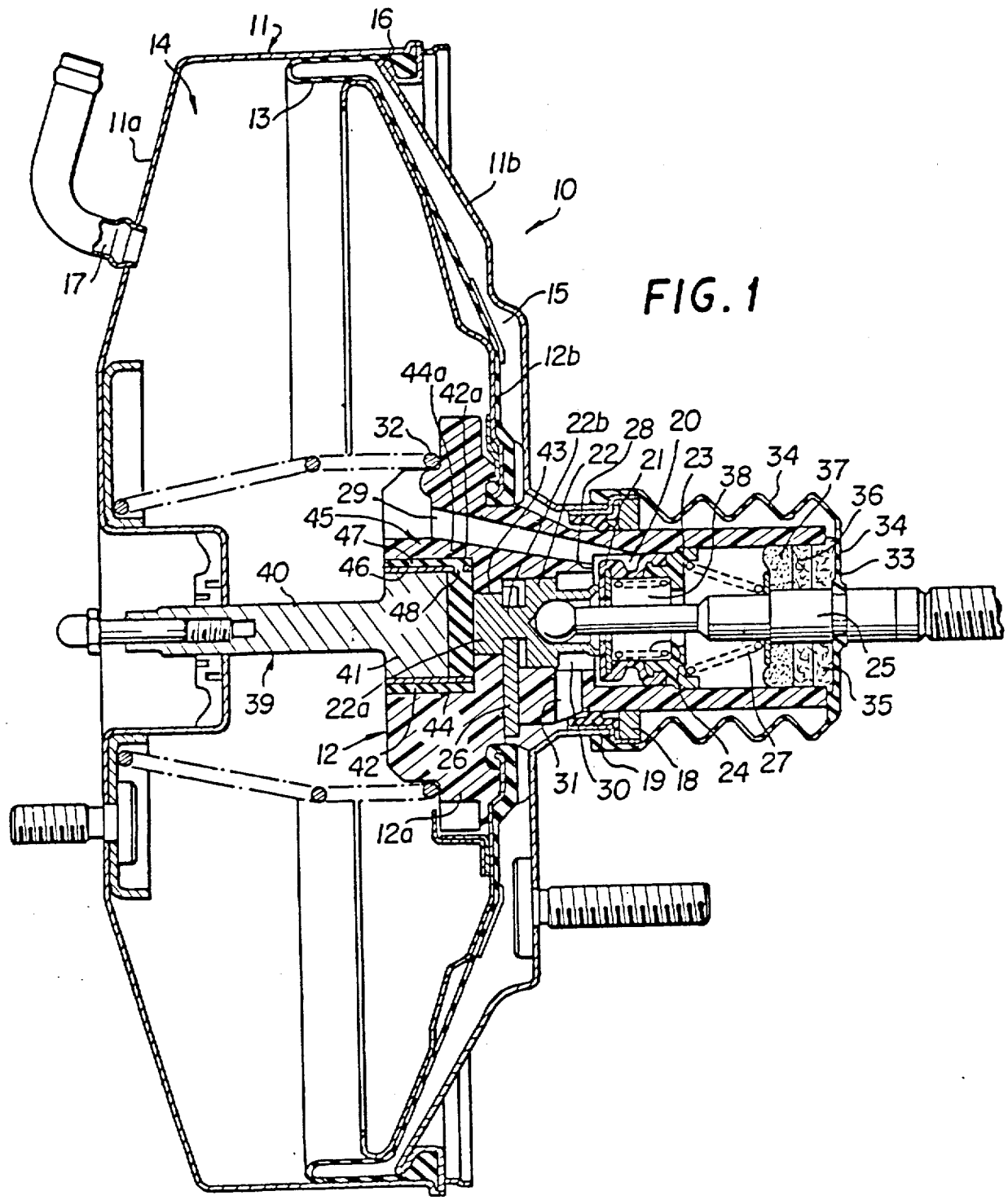

Referring now to the attached drawings, numeral 10 designates generally a vacuum booster to be used for assisting automobile brakes (not shown). A housing 11 for the booster has two sections 11a and 11b connected by a suitable connecting mechanism (not shown). The housing 11 is divided into two compartments 14 and 15 by power piston 12 made of resinous material and a diaphragm member 13. The power piston 12 has a central hub portion 12a and a metallic disc portion 12b integrally connected to the hub portion. The outer bead portion of the diaphragm 13 is hermetically sealed with the housing 11 by the inner wall thereof and a retainer member 16.

The inner bead of the diaphragm 13 is air-tightly held by the hub portion 12a and disc portion 12b. The front compartment 14 is connected to a vacuum source (in this embodiment, the intake manifold of an engine) via port 17. The hub portion 12a has a cylindrical portion extending rearwardly (to the right of FIG. 1) and the right end thereof extends outwardly from the rear wall of housing 11.

Seal member 19 is inserted between the rear wall of housing 11 and the outer surface of the cylindrical portion of the piston 12 and air-tightly supports the cylindrical portion with bearing member 18 connected to the seal member 19. The hub portion 12a has a hollow portion formed therein within which a conventional control valve mechanism 20 is housed.

The mechanism 20 includes a control valve 21 and air valve element 22. The control valve 21 is secured to the inside surface of the cylindrical portion of the piston 12 at a rear end portion thereof by retainer 23.

The control valve 21 is normally biased toward the left by spring 24. Air valve element 22 is connected to the left end of push rod 25 which is operatively connected to a brake pedal (not shown). Element 22 includes a front end portion 22a and a small diameter portion 22b provided next to the portion 22a. A key member 26 is inserted in the power piston 12 and is further engaged with the air valve element 22 with a slit portion provided in the key memeber 26. Thus the rearmost position of the air valve element 22 is defined by the key member 26.

When the brake pedal is not depressed, push rod 25 is in a retracted position due to the force of spring 27 and air valve 22 is positioned as shown in FIG. 1 by the key member 26. The rear end of the air valve element 22 is then in contact with the front end of the control valve 21. The front end of the control valve 21 is then separated from seat 28 provided on the piston 12. Thus the vacuum pressure in the front compartment 14 is supplied to the rear compartment 15 via passage 29 provided in the piston 12, the clearance between the seat 28 and control valve 21, passage 30 provided on the air valve element 22 and passage 31 provided in the piston 12. The power piston 12 thus maintains its retracted position (shown in FIG. 1) due to the biasing force of return spring 32.

When the brake pedal is depressed upon application of the brake, push rod 25 is moved toward the left so as to move the air valve element 22 in the same direction (to the left of FIG. 1). Then control valve 21 is moved to the left by spring 24 so as to be seated on seat 28 and interrupt communication between compartments 14 and 15. Further, the rear end of the air valve element 22 is separated from the front end of the control valve 21 so as to allow atmospheric pressure into the rear compartment via holes 34 of boot member 33, filters 35, 36 and 37, passage 38, the clearance between the valve 21 and the rear end of the air valve element 22, passage 30 and passage 31 of the piston 12. Due to the pressure differential between compartments 14 and 15, the power piston 12 is moved to the left overcoming the force of spring 32.

Output means 39 includes output rod 40 which is air-tightly and slidably engaged with the front shell 11a and a reaction force apparatus 45 connected to the output rod 40. Reaction force apparatus 45 includes a column 41 formed integrally with the output rod 40. Colum 41 is slidably disposed within a large diameter cylindrical surface portion 42 formed in the portion 12a. Reaction force apparatus 45 further includes a resilient reaction disc 44 made of rubber. The large diameter cylindrical portion 42 communicates with a small diameter cylinder portion 43 in which the front end 22a of the air valve element 22 is slidably disposed. Metallic sleeve 46 is disposed between the outer circumferential portions of the column 41 and the reaction disc 44 to enclose the disc 44 and the column 41. Further, a resilient cylindrical member 47 is air-tightly disposed in the inner surface of larger diameter cylindrical surface portion 42 and is secured to sleeve 46.

The metallic sleeve 46 extends along the entire axial length of cylindrical member 47 and said cylindrical surface portion 42 and is provided with a small hole 48 which substantially interrupts the reaction disc 44 from transmission of an inner reaction force due to compression of reaction disc 44 to the resilient member 47 located outside of the metallic sleeve 46. This small hole 48 also enables the unitary formation of reaction disc 44, resilient member 47 and metallic sleeve 46. Further, the small hole 48 prevents the sleeve 46 from being dislodged from the cylindrical portion 42. The rear end 42a of the cylindrical portion 42 is rounded to prevent any cracks at the hub portion 12a due to stress concentration thereto. Similarly, the rear end 44a of the resilient member 47 is rounded to fit with the cylindrical portion 42.

When the brake pedal is depressed upon application to the brakes, the clearance between the reaction disc 44 and the front end of the air valve element 22 is reduced in response to the leftward movement of push rod 25 and therefore the element 22. However, when the control valve mechanism 20 is in a neutral position, i.e., control valve 21 is in contact with the valve seat 28 and air valve element 22 is in contact with the control valve 21, there still remains a clearance between the disc 44 and element 22. The contact therebetween will not occur in the initial braking stage where the valve element 22 is separated from the valve 21 and where the thrust is generated at power piston 12 due to the increase of pressure in the rear compartment 15. In other words, although the thrust of the power piston 12 is transmitted to the output member 39 through reaction disc 44, the reaction force to the thrust will not be transmitted to the brake pedal, in the initial braking stage.

The reaction disc 44 is compressed between the power piston 12 and output member 39. In response to the increase of thrust at the power piston 12, the disc 44 is extended into the small diameter cylinder portion 43 so as to be in contact with the front end of the air valve element 22 and move the same toward the right against the pedal depression force. This means the reaction force is applied in operation to the brake pedal depression. If the reaction force overcomes the pedal force, air valve element 22 is retracted (i.e., is moved to the right) so as to be in contact with the control valve 21 and at the same time the valve 21 is separated from the seat 28 so as to decrease the pressure differential between the compartments 14 and 15. When the reaction force is too small to overcome the pedal force, the pressure differential increases so as to increase the thrust of the power piston.

FIG. 2 shows another embodiment of the reaction force apparatus. The sleeve 46 here includes a flange 49 between the right side wall of the cylindrical portion 42 and the right side of the reaction disc 44, thus preventing the sleeve 46 from being dislodged from the cylindrical portion 42. Since the column 41 and reaction disc 44 are enclosed by a metallic sleeve 46, the pressure from the reaction disc upon the inner surface of the cylindrical portion 42 is reduced and the stress upon the rear end 42a of the cylindrical portion 42 is also reduced so as to prevent the occurrence of cracks in the power piston. Further, non-axial contact between output member 39 and the cylindrical portion 42 is absorbed by the resilient member 47.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A vacuum booster comprising:
  a push rod;
  a housing having a first and second compartment;
  power piston means located in said housing and operated by a pressure differential between said first and second compartment and which further comprises a small diameter portion and a large diameter portion;
  control valve means operatively associated with said push rod and located within said power piston means for controlling the pressure differential between said first and second compartments in response to the movement of said push rod;
  output means having a first end slidably disposed within said large diameter portion of said power piston means wherein said control valve means further comprises an air-valve element one end of which is slidably disposed in said small diameter portion of said power piston means;
  a resilient reaction disc located adjacent said first end of said output means and disposed within said large diameter portion of said power piston means;
  a metallic sleeve contacting an outer peripheral portion of said first end of said output means and an outer peripheral portion of said reaction disc; and
  a resilient member provided between a cylindrical surface portion of said large diameter portion of said power piston means and said metallic sleeve wherein said resilient member has an inner cylindrical surface in contact with an outer cylindrical surface of said metallic sleeve and said metallic sleeve has a hole formed therein for substantially interrupting a compression reaction force transmission from said reaction disk to said resilient member.

2. A vacuum booster as set forth in claim 1, wherein said metallic sleeve further comprises a flange member extending therefrom between a side wall portion of said large diameter portion of said power piston means and a side portion of said reaction disc for preventing said metallic sleeve from being dislodged from said larger diameter portion of said power piston.

3. A vacuum booster as set forth in claim 1, wherein said large diameter portion is cylindrically shaped and a rear end portion thereof is rounded for prevention of cracking under stress.

4. A vacuum booster as set forth in claim 1, wherein a rear end portion of said resilient member is rounded for being fitted within said large diameter portion of said power piston.

5. A vacuum booster as set forth in claim 1, wherein said large diameter portion is cylindrically shaped and a rear end portion thereof is rounded for prevention of cracking under stress and wherein a rear end portion of said resilient member is rounded for being fitter with said large diameter portion of said power piston.

6. A vacuum booster as set forth in claim 1, wherein said resilient member extends axially along the entire axial length of said metallic sleeve and said cylindrical surface portion of said large diameter portion.

* * * * *

UNITED STATES PATENT AND TRADEMARK OFFICE
CERTIFICATE OF CORRECTION

PATENT NO. : 4,494,443

DATED : January 22, 1985

INVENTOR(S) : KAORU TSUBOUCHI

It is certified that error appears in the above-identified patent and that said Letters Patent is hereby corrected as shown below:

Column 2, line 48 change "Thus the rear-" to --Thus, the rear---;

Column 2, line 52 change "spring 27 and" to --spring 27, and--;

Column 2, line 57 change "Thus the" to --Thus, the--;

Column 1, line 28 change "provide be-" to --provided be---;

Column 2, line 67 change "of the brake," to --of the brakes,--;

Fig. 1 should be deleted to appear as shown on the attached sheet.

Signed and Sealed this

Twenty-fourth Day of September 1985

[SEAL]

Attest:

DONALD J. QUIGG

Attesting Officer

Commissioner of Patents and Trademarks—Designate